United States Patent [19]

Kirk-Duncan

[11] 4,276,899
[45] Jul. 7, 1981

[54] FAUCETS

[76] Inventor: Brian A. C. Kirk-Duncan, The Rectory, St. Mary at Hill, London, EC3R 8EE, England

[21] Appl. No.: 12,420

[22] Filed: Feb. 15, 1979

[51] Int. Cl.³ .................. F16K 15/18; F16K 7/16; F16K 43/00
[52] U.S. Cl. .................. 137/327; 137/329.3; 251/331
[58] Field of Search .......... 137/315, 329.3, 329.4, 137/327, 329.2; 251/331

[56] References Cited

U.S. PATENT DOCUMENTS 2,837,110  6/1958  Graybill .................. 251/331 x

FOREIGN PATENT DOCUMENTS

| 409979 | 1/1943 | Canada . |
| 453571 | 12/1948 | Canada . |
| 598162 | 5/1960 | Canada . |
| 726974 | 1/1966 | Canada . |
| 826226 | 12/1951 | Fed. Rep. of Germany ........... 251/331 |
| 739221 | 10/1932 | France ................................ 251/331 |
| 485121 | 10/1953 | Italy .................................... 251/331 |
| 322919 | 12/1929 | United Kingdom . |
| 376702 | 1/1931 | United Kingdom . |
| 636061 | 4/1950 | United Kingdom . |
| 790426 | 2/1958 | United Kingdom . |
| 826504 | 1/1960 | United Kingdom . |
| 1165245 | 9/1969 | United Kingdom . |
| 1206556 | 9/1970 | United Kingdom . |
| 1263521 | 2/1972 | United Kingdom . |
| 1329390 | 9/1973 | United Kingdom . |
| 1357302 | 6/1974 | United Kingdom . |
| 1408404 | 10/1975 | United Kingdom . |
| 1036597 | 7/1966 | United Kingdom .................. 251/331 |

Primary Examiner—Arnold Rosenthal
Attorney, Agent, or Firm—Sughrue, Rothwell, Mion, Zinn and Macpeak

[57] ABSTRACT

A faucet has a sealing member clamped at its periphery and overlying an orifice through which fluid is to flow. Pressure applying means maintains the sealing member in sealing engagement with the wall defining the orifice. Upon removal of the pressure applying means the sealing member moves away from the orifice to permit flow.

The pressure applying means is located in a valve body which is screwed into the faucet housing and acts to change the periphery of the sealing member. The valve body may be removed by removing the handle and engaging a pair of projections within the handle with a pair of ears on the valve body. The sealing member is thus unclamped and easily removed.

10 Claims, 4 Drawing Figures

FAUCETS

This invention relates to devices for controlling liquid flow and in particular to faucets for domestic installations.

It is of course known to provide a faucet with a valve to control flow of water into a basin or similar receptical. The valve members associated with the faucet is usually operated by rotation of a spindle which moves a seal toward and away from a seat.

The seal is usually carried by the spindle and is formed from an elastomeric material such as rubber. The spindle is located within a valve housing and projects therethrough for connection to a suitable handle. It is therefore necessary to provide suitable seals between the spindle and the valve housing Since the seal is carried on the spindle it is subject to both torsional and compressive strains as it is brought into contact with the associated seat. This subjects the seal to relatively rapid wear which causes leaking of the faucet. This causes the faucet to drip which results in an appreciable increase in energy consumption, particularly where the faucet is controlling a heated water supply, as well as being a source of aggravation for the householder.

It is therefore necessary on a reasonably frequent basis to change the seal member.

This operation has traditionally required the use of skilled assistance which is naturally very expensive. Even where the householder possesses the knowledge required to change the seal himself it is necessary for him to possess the correct tools to disassemble the faucet. The valve housing of the faucet is usually assembled by means of a large nut which means that the average householder does not have a spanner suitable for disassembly. The replacement of the seal member which may itself only cost a few cents therefore requires the use of skilled labour resulting which becomes expensive. This problem is compounded in large commercial organizations such as large hotels which utilize many hundreds of taps.

It is an object of the present invention to obviate or mitigate the above disadvantages.

According to the present invention there is provided a faucet for controlling liquid flow comprising a housing, wall means in the housing defining an orifice through which liquid is to flow, a substantially flat sealing member overlying the orifice with one face of the sealing member opposing the orifice, a support surface for the periphery of the sealing member, said surface being provided by a radially inwardly extending flange coaxial with said orifice, clamping means for holding the periphery of the sealing member into seating contact with the support surface, pressure applying means selectively operable to apply pressure to the outer face of the sealing member to force the one face into sealing contact with the orifice, and a handle adapted to operate the pressure applying means, said pressure applying means including a piston slidably mounted on said housing and having guide means cooperating with said housing to prevent rotation of said piston relative to said housing and a spindle rotatably mounted in said housing and connected to said handle for rotational movement therewith, said spindle having a threaded portion engaging a complementary threaded portion provided on said piston whereby rotation of said spindle by said handle induces sliding movement of said piston relative to said housing to control movement of said sealing member and regulate flow through said orifice.

According to a further aspect of the present invention there is provided a valve assembly for a faucet arranged to be detachably secured in a housing, the valve assembly including a valve body, a valve operating member extending from said body, a handle detachably connected to said operating member for selective operation thereof, and two pairs of mutually engageable elements, the two elements of one pair being positioned on opposite sides of the handle, and the two elements of said other pair being positioned on opposite sides of the valve body, whereby upon disengagement of said handle from said operating member and movement of said handle away from said valve body, said elements may be brought into engagement and torque transmitted from said handle to said valve body to facilitate removal thereof from said housing.

The sealing force is imparted to the sealing member by the non-rotatable piston in order to avoid subjecting the sealing member to torsional loads. The handle may be detached and is preferably provided with a pair of inwardly directed projections which engage in suitable holes in the valve housing. This enables the handle to be used as a tool to disassemble the valve housing and permit change of the seal.

Embodiments of the invention will now be described by way of example only with reference to the accompanying drawings, in which.

Figure 1:
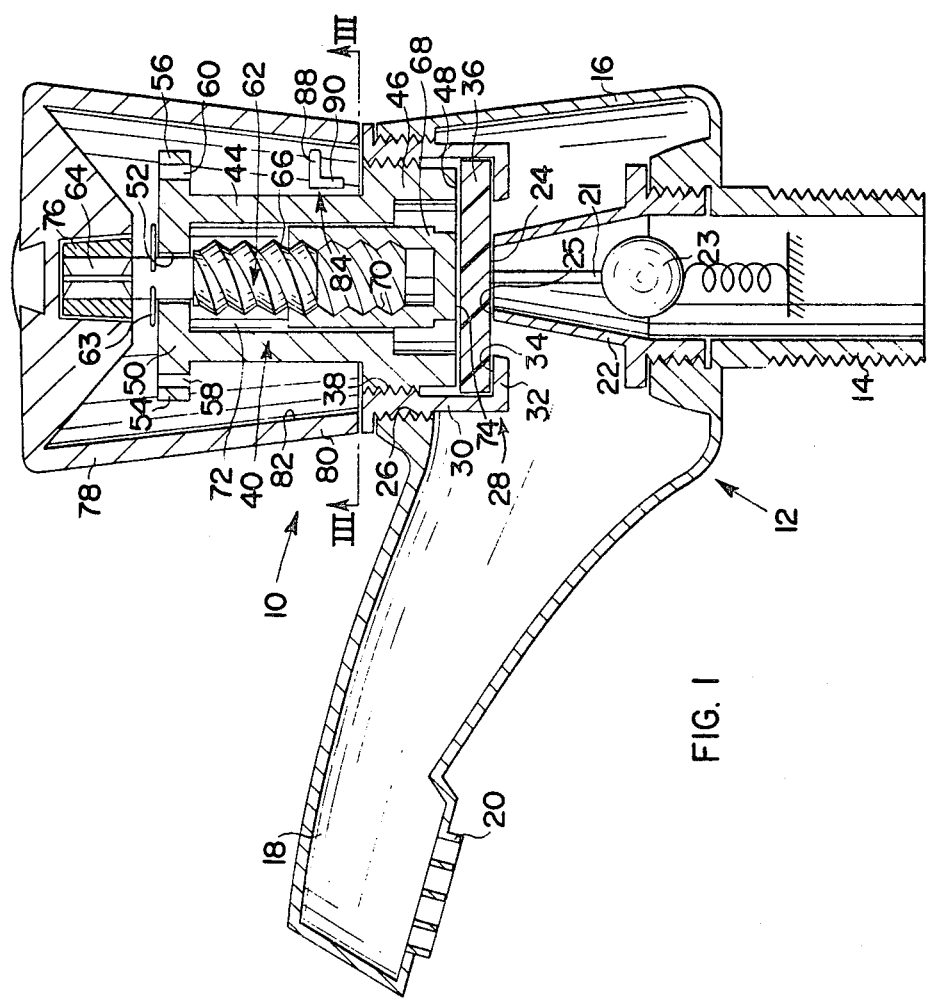
FIG. 1 is a cross-sectional elevation through a faucet in an assembled and sealing position.

Referring now to FIG. 1 a faucet generally designated 10 includes a body 12. The body 12 comprises a tubular threaded portion 14 which depends from a valve cavity 16. The valve cavity opens into a spout portion 18 having a suitable discharge nozzle 20.

A valve seat 22 is screwed into the valve cavity 16 through screw threaded portion 14. The valve seat 22 is of frustoconical shape which terminates in an annular wall 25 to define an orifice 24.

A check valve 23 is located within the valve seat 22 and is biased by a light spring (schematically shown) into a sealing position with the valve seat 22. A spigot 21 is provided on the check valve 23 and extends upwardly into abutment with a sealing member 36 so that the check valve 23 is normally held open.

An aperture 26 is formed at the opposite side of the valve cavity 16 to the threaded portion 14 to receive a seal support housing 28. The seal support housing 28 comprises a cylindrical body portion 30 and a radially inwardly extending flange 32.

The flange 32 encompasses the upper portion of the valve seat 22 so that the orifice 24 lies in the same plane as an upper surface 34 of the flange 32.

Sealing member 36 is supported on the upper surface 34 so as to overlie the orifice 24. The sealing member is preferably made from an elastomeric material although any suitable flexible material may be used.

An internal surface 38 of the body portion 30 is threaded to receive a valve assembly 40. The assembly 40 has an valve body 42 which is defined by upper and lower interconnected cylindrical portions 44, 46 respectively. The lower portion 46 has a thread formed in the outer surface thereof to co-operate with the threaded surface 38 of the body portion 30. The lower portion 46 terminates in annular surface 48 which engages an upper surface of the seal member 36 and is aligned with the surface 34 of the flange 32. The seal member 36 is therefore clamped between the surfaces 34 and 48 so that rotation thereof is avoided.

The upper portion 44 is closed by a partition 50 with a throughbore 52. The partition 50 extends to either side of the upper portion 44 to form a pair of diametrically opposed ears 54, 56, as can best be seen in FIG. 3. Each ear 54, 56 has a throughbore 58, 60, respectively.

A spindle 62 extends through the throughbore 52 and is rotatably secured therein by a circlip 63. The spindle 62 has a large pitch thread 66 formed at one end which extends toward the sealing member 36. A piston 68 has a mating internal threaded surface 70 and is slidingly received within a closed bore 72 in the upper body portion 46. As can best be seen in FIG. 3, the piston 68 and bore 72 have a hexagonal cross-section so that rotation of the piston 68 is prevented.

The piston 68 has a planar end surface 74 which engages the upper surface of the seal member and overlies the orifice 24.

Figure 3:
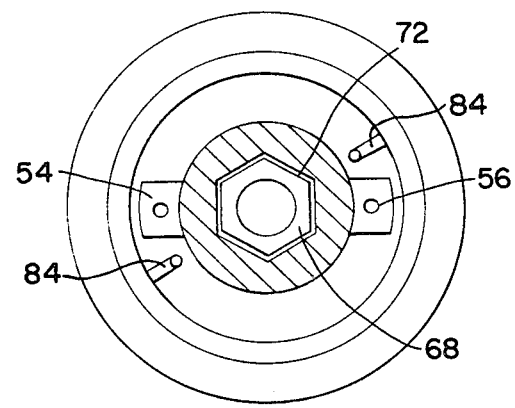
FIG. 3 is a view on the line III—III of FIG. 1.

The opposite end of the spindle 62 to the thread 66 has a series of flats 64 formed thereon. The flats 64 engage in a socket 76 which is integrally formed with a handle 78. The handle 78 has a peripheral wall 80 which extends downwardly toward the upper surface of the seal support housing 28. The inner surface 82 of the wall 80 has a pair of integrally formed inwardly extending projections 84 thereon. The projections are formed with an radially extending arm 88 and an axially extending arm 90. The pitch circle diameter of the axially extending arms 90 is the same as the pitch circle diameter of the throughbores 58, 60. The flats 64 are arranged so that with the valve assembly in a closed position the projections 84 are circumferentially displaced from the ears 54, 56 as shown in FIG. 3.

The operation of the device is as follows:

The threaded portion 14 is connected to the normal domestic water supply so that fluid under pressure is delivered to the interior of the valve seat 22. The spigot 21 is in abutment with the sealing member 36 so that the check valve 23 is held off its seat. The end surface 74 of the piston 68 forces the sealing member into contact with the annular surface 25 of the valve seat so that flow through the orifice 24 is prevented. It will be observed that in this position the piston end surface 74 extends across the orifice 24 so that the sealing member is only subject to compressive forces in a closed position.

To open the faucet and permit fluid to flow through the orifice and into the spout 18, the handle 78 is turned clockwise which causes the spindle 62 to rotate clockwise. Since the piston 68 is held against rotation the threads 66 and 70 will co-operate to cause the piston to move axially along the bore 72. The piston end surface 74 is thus moved away from the upper surface of the sealing member 36 which allows the sealing member to flex. Fluid pressure therefore moves the sealing member 36 away from the annular surface 25 and permits flow into the spout 18. The spigot 21 still holds the check valve 23 away from its seat since movement of the seal member 36 is insufficient to permit seating.

To close the faucet the handle 78 is rotated anti-clockwise to move the piston 68 back into the sealing position. It will be noted that the sealing member is not subjected to torsional rotation during opening and closing of the valve since the piston 68 is non-rotatable and the periphery of the sealing member is firmly held between the surfaces 34 and 48.

It will also be noted that the sealing member 36 partitions the valve assembly from the fluid. This enables the faucet to be assembled without additional sealing arrangement around the spindle 62 and improves the fluid tightness of the faucet.

Figure 2:
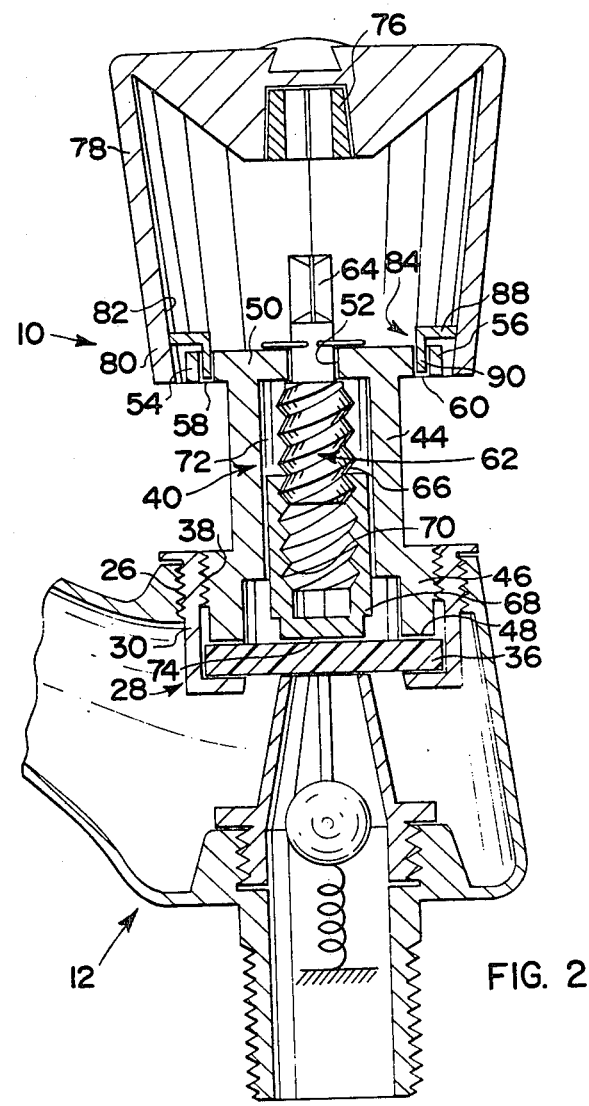
FIG. 2 is a sectional elevation similar to that shown in FIG. 1 with the components arranged to assist in disassembly of the faucet.

In order to renew the sealing member or to disassemble the faucet, the handle 78 is first removed by pulling axially upwards. The flats 64 thus are disengaged from the socket 76 and the handle 78 can be removed. The handle 78 is then positioned in the manner shown in FIG. 2 with the axially extending arm 90 engaged in each of the bores 58, 60. The handle 78 can then be twisted to unscrew the valve assembly 40 from the sealing member support housing 28. As the valve assembly is removed the fluid pressure acting on the sealing member 36 forces it away from the upper surface 34 of the flange 32. This permits the check valve 23 to seat within the valve seat 22 and prevent flow of fluid through the orifice 24. The sealing member 36 may then be readily removed and a new sealing member inserted.

The valve assembly 40 may then be screwed into the seal support housing by using the handle 78 which may then be reassembled on the spindle 62.

The relative axial positions of the projections 84 and the ears 54, 56 permits full rotation of the handle to accomplish full opening of the faucet. It will be seen therefore that the arrangement disclosed herein permits assembly and disassembly of the faucet without the need for special tools or skilled labour.

Figure 4:
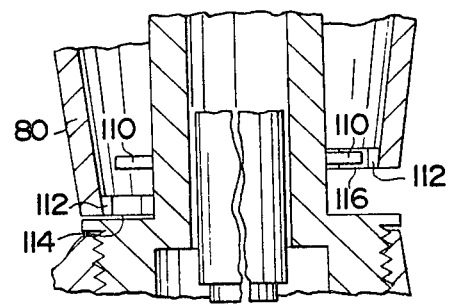
FIG. 4 is a scrap view of a portion of a further embodiment of a faucet showing alternative positions of the components thereof on opposite sides of the FIGURE.

FIG. 4 shows a further arrangement of handle and valve assembly in which pins 110 are located on the upper body portion 44. A ring 112 is secured within the peripheral wall 80. The ring 112 has a pair of diametrically opposed grooves 114, 116 which are dimensioned to pass over the pins 110. As can be seen from the left hand side of FIG. 4, when the socket is located on the flats the ring 112 is below the pins 110 to permit rotation of the handle. Upon removal of the handle from the spindle, the pins 110 may be positioned in the grooves 114, 116, as shown in the right hand side of FIG. 4 to permit disassembly of the faucet.

The arrangement shown in FIG. 4 may be constructed so that it is not necessary to completely detach the handle. The handle may be attached to provide limited axial movement to enable the pins to engage the grooves in the manner of a bayonet fastening.

Further the check valve 23 may be made buoyant and a transverse wire provided to retain the check valve within the threaded portion. A groove may be provided to assist in location of the check valve if desired.

It will of course be evident that the particular arrangement of sealing member can be used independently of the arrangement of the handle. However, by combining the two arrangements the use of sealant to secure the valve assembly within the body is not required since the valve assembly is not exposed to fluid. This enables the torque required to assemble and disassemble the body to be reduced. The danger of the valve assembly becoming corroded into the body is also reduced.

It will also be appreciated that other types of valve operating mechanisms can be utilized other than rotary members, such as cams and levers.

Also it is not essential for the sealing member to be formed from a flexible material. The central position of the sealing member could be rigid with the peripheral portions formed with flexible material. Alternatively, surfaces 34, 48 could be axially spaced so that the sealing member could float between open and closed positions. With such an arrangement however, the likelihood of leakage and premature wear may be increased.

What I claim is:

1. A faucet for controlling liquid flow comprising a housing, wall means in said housing defining an orifice through which liquid is to flow, a substantially flat sealing member overlying said orifice, a support surface for the periphery of said sealing member, said surface being provided by a radially inwardly extending flange coaxial with said orifice, clamping means for holding the periphery of said sealing member into sealing contact with said support surface, pressure applying means selectively operable to apply pressure to the other face of said sealing member to force said one face into sealing contact with said orifice, and a handle adapted to operate said pressure applying means, said pressure applying means including a piston slidably mounted in said housing and having guide means cooperating with said housing to prevent rotation of said piston relative to said housing and a spindle rotatably mounted in said housing and connected to said handle for rotational movement therewith, said spindle having a threaded portion engaging a complementary threaded portion provided on said piston whereby rotation of said spindle by said handle includes sliding movement of said piston relative to said housing to control movement of said sealing member and regulate flow through said orifice.

2. A faucet according to claim 1 wherein said housing includes an inlet, a valve assembly cavity and an outlet and said wall means extend from said inlet into said cavity.

3. A faucet according to claim 2 wherein said support surface is spaced from said wall means.

4. A faucet according to claim 3 wherein said flange is connected to said housing by a peripheral wall within said cavity.

5. A faucet according to claim 4 wherein said clamping means is detachably secured to said peripheral wall.

6. A faucet according to claim 4 or 5 wherein said peripheral wall is detachably connected to said housing.

7. A faucet according to claim 1 wherein said piston includes a planar surface engagable with said sealing member and overlying said orifice to provide support for said sealing member.

8. A faucet according to claim 1 including a generally cylindrical seal support housing having a peripheral wall and said flange formed at one end thereof, said seal support housing being connected to said faucet housing and projecting inwardly therefrom, said sealing member extending between said peripheral wall portions adjacent said flange to seal the interior of said support housing.

9. A faucet according to claim 8 wherein said clamping means are detachably secured to said peripheral wall within said seal support housing.

10. A faucet according to claim 9 wherein said pressure applying means is located within a body detachably secured to said peripheral wall, said body having an annular surface overlying said support surface to constitute said clamping means.

* * * * *